US006492063B1

(12) United States Patent
Ikeda et al.

(10) Patent No.: US 6,492,063 B1
(45) Date of Patent: Dec. 10, 2002

(54) LITHIUM SECONDARY BATTERY

(75) Inventors: Hiroaki Ikeda, Hyogo (JP); Masahisa Fujimoto, Osaka (JP); Shin Fujitani, Hirakata (JP); Takuya Hashimoto, Hirakata (JP); Yasuhiko Itoh, Yawata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 124 days.

(21) Appl. No.: 09/686,804

(22) Filed: Oct. 12, 2000

(30) Foreign Application Priority Data

Oct. 15, 1999 (JP) ............................................ 11-294477

(51) Int. Cl.⁷ ................................................ H01M 4/58
(52) U.S. Cl. .............................. 429/231.95; 429/231.5; 429/218.1; 252/182.1
(58) Field of Search ........................ 429/218.1, 231.95, 429/231.9, 231.5; 252/182.1

(56) References Cited

U.S. PATENT DOCUMENTS 6,090,505 A * 7/2000 Shimamura et al. ..... 429/218.1

FOREIGN PATENT DOCUMENTS

| JP | A 10302770 | 11/1998 |
| JP | A 11 86854 | 3/1999 |

OTHER PUBLICATIONS

Y. Geronov et al., "The Secondary Lithium–Aluminium Electrode at Room Temperature", Journal of Power Sources, vol. 12, 1984, pp. 145–153.

* cited by examiner

Primary Examiner—Stephen Kalafut
Assistant Examiner—R Alejandro
(74) Attorney, Agent, or Firm—Birch, Stewart, Kolasch & Birch, LLP

(57) ABSTRACT

In a lithium secondary battery of this invention, the negative electrode uses, as an active material, an alloy including an A phase of a first intermetallic compound (A), and a B phase of a second intermetallic compound (B) having the same constituent elements as and a different composition from the first intermetallic compound (A) and/or a C phase consisting of one of the constituent elements of the first intermetallic compound (A), and at least one of the A phase, the B phase and the C phase is capable of electrochemically absorbing and discharging lithium ions. Thus, the lithium secondary battery can exhibit good charge-discharge cycle performance.

4 Claims, 1 Drawing Sheet

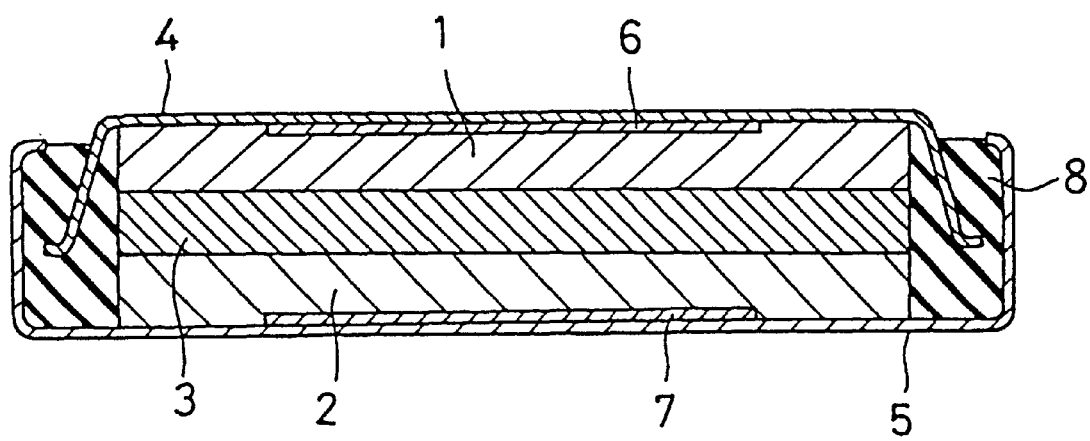
Figure

LITHIUM SECONDARY BATTERY

BACKGROUND OF THE INVENTION

This application claims the Paris convention priority of Japanese Patent Application No. 11-294477/1999 filed on Oct. 15, 1999, which is incorporated herein by reference.

The present invention relates to a lithium secondary battery, and more particularly, it relates to improvement of a negative electrode active material for the purpose of improving the charge-discharge cycle performance of a lithium secondary battery.

In a lithium secondary battery, the battery characteristics such as the charge-discharge voltage, the charge-discharge cycle performance and the storage characteristic are greatly varied depending upon active materials used in its positive and negative electrodes.

As an active material of the negative electrode, metallic lithium is well known. In a lithium secondary battery using metallic lithium, lithium is deposited from the electrolyte during charge and is dissolved into the electrolyte during discharge. Although the lithium secondary battery can attain a high energy density per unit weight and unit volume by using metallic lithium, there arises a problem that lithium is deposited in the form of dendrite on the negative electrode during charge, resulting in causing internal short-circuit.

In order to overcome this problem, metallic aluminum has been proposed as a negative electrode active material usable instead of metallic lithium (Journal of Power Sources, 12 (1984), pp. 145–153). In a lithium secondary battery using metallic aluminum, lithium is inserted into the metallic aluminum during charge and is released from the metallic aluminum during discharge. Differently from the use of metallic lithium where lithium is dissolved and deposited, the metallic aluminum merely serves as a host for absorbing and discharging lithium. Accordingly, there is no fear of the deposition, during charge, of dendritic lithium causing internal short-circuit.

Metallic aluminum, however, largely expands by absorbing lithium and largely shrinks by discharging lithium. In other words, the volume is largely and repeatedly changed during charge-discharge cycles. As a result, the metallic aluminum is changed into a fine powder and its current collecting property is degraded, resulting in degrading the charge-discharge cycle performance. This is the reason why a lithium secondary battery using metallic aluminum as the negative electrode active material is practically used as a backup battery for a memory merely at a small depth of charge-discharge of approximately several percentages in spite of its theoretical capacity (i.e., 992 mAh/g) much larger than that of graphite (i.e., 372 mAh/g).

Accordingly, an object of the invention is providing a lithium secondary battery exhibiting good charge-discharge cycle performance by using a negative electrode active material with small volume change during charge and discharge.

SUMMARY OF THE INVENTION

The lithium secondary battery of this invention (present battery) comprises a positive electrode; a negative electrode; and a nonaqueous electrolyte, and the negative electrode uses an active material formed from an alloy including an A phase of a first intermetallic compound (A), and a B phase of a second intermetallic compound (B) having the same constituent elements as and a different composition from the first intermetallic compound (A) and/or a C phase consisting of one of the constituent elements of the first intermetallic compound (A), and at least one of the A phase, the B phase and the C phase is capable of electrochemically absorbing and discharging lithium ions.

As a result, the lithium secondary battery of this invention can exhibit good charge-discharge cycle performance.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein:

FIGURE is a cross-sectional view of a lithium secondary battery fabricated in an embodiment.

DETAILED DESCRIPTION OF THE INVENTION

The negative electrode active material of the present battery is an alloy including the A phase, the B phase and the C phase, an alloy including the A phase and the B phase, or an alloy including the A phase and the C phase. The A phase and the B phase have different electrochemical potentials because they are formed from the intermetallic compounds having the same constituent elements but different compositions. Furthermore, the C phase has a different electrochemical potential from the A and B phases because the A phase and the B phase are formed from the intermetallic compounds and the C phase consists of one of the constituent elements of the intermetallic compounds. Insertion of lithium during charge is proceeded in these phases successively in the descending order of the electrochemical potential. Now, the principle of the invention will be described by exemplifying the case where the negative electrode active material is an alloy including an A phase having a higher electrochemical potential and a B phase. During charge, lithium is inserted first into the A phase having the higher electrochemical potential. While lithium is being inserted into the A phase during charge, lithium is never inserted into the B phase. Therefore, during the insertion, the A phase absorbing lithium is to expand but the B phase in contact with the A phase never expands. Accordingly, the expansion of the A phase is suppressed by the B phase, so that the entire alloy can be suppressed from expanding.

When the charge is continued, the lithium absorbing site of the A phase is filled up, and lithium starts to be inserted into the B phase. As the B phase expands due to the insertion of lithium, the force of the B phase to suppress the expansion of the A phase is lowered. Therefore, from the viewpoint of charge-discharge cycle performance, the amount of lithium inserted into the B phase is preferably as small as possible. The charge-discharge capacity is, however, increased as the amount of lithium inserted into the B phase is larger. Accordingly, a practical battery is preferably designed in consideration of the trade-off relationship between the charge-discharge cycle performance and the charge-discharge capacity.

The negative electrode active material (alloy) of this invention can be obtained by, for example, melting a mixture of pure metals or compounds of the constituent elements by arc-melting, high frequency induction heating, resistance heating or the like in an inert gas or under vacuum and cooling the resultant mixture. Since a too high cooling rate results in a single phase alloy, the cooling rate should be sufficiently low to obtain a polyphase alloy in cooling the completely melted alloy. In employing, for example, arc-melting, it is necessary to cool the melted alloy gradually with the arc current set to a lower value than in the arc-melting before cooling the melted alloy in a water-cooled crucible.

Examples of the first intermetallic compound (A) and the second intermetallic compound (B) are intermetallic compounds of Al and Mo (such as $Al_{12}Mo$, $Al_5Mo$, $Al_8Mo_3$, $Al_{63}Mo_{37}$, AlMo and $AlMo_3$), intermetallic compounds of Sn and Sb (such as $Sn_3Sb_2$ and SnSb), intermetallic compounds of Sn and Fe (such as $Fe_3Sn_2$, FeSn and $FeSn_2$), intermetallic compounds of Sn and Cu (such as $Cu_6Sn_5$, CuSn, $Cu_3Sn$ and $Cu_{41}Sn_{11}$), intermetallic compounds of Sn and Ag (such as $Ag_3Sn$ and $Ag_4Sn$), intermetallic compounds of Sn and Co (such as $Co_3Sn_2$, CoSn, $CoSn_2$ and $CoSn_3$), intermetallic compounds of Si and Ca (such as $Ca_2Si$ and CaSi), intermetallic compounds of Si and Mg (such as $Mg_2Si$), and intermetallic compounds of Mg and Ge (such as $Mg_2Ge$). The term, "intermetallic compound" is herein used as a general term meaning an alloy represented by a comparatively simple proportion between constituent elements like an inorganic compound and having a peculiar crystal structure (See "Glossary of metal terms", revised and enlarged edition, published by The Japan Institute of Metals (1995) p. 62).

The invention is applicable to both a lithium secondary battery which needs charge before initial discharge and a lithium secondary battery which does not need charge before initial discharge. When the invention is applied to a lithium secondary battery which does not need charge before initial discharge, an alloy including lithium is used as the active material of the negative electrode.

The invention is characterized by use of an alloy with small volume change during charge and discharge as the negative electrode active material. Therefore, the positive electrode active material and the nonaqueous electrolyte can be made from any of conventionally known materials for a lithium secondary battery.

Examples of the positive electrode active material are transition metal oxides including lithium such as $LiCoO_2$, $LiNiO_2$, $LiMn_2O_4$, $LiMnO_2$, $LiCo_{0.5}Ni_{0.5}O_2$ and $LiCo_{0.2}Mn_{0.1}O_2$ and transition metal oxides not including lithium such as $MnO_2$.

Examples of a solvent of the nonaqueous electrolyte are a mixed solvent of cyclic carbonate such as ethylene carbonate, propylene carbonate and butylene carbonate and chain carbonate such as dimethyl carbonate, methylethyl carbonate and diethyl carbonate; and a mixed solvent of cyclic carbonate and ether such as 1,2-dimethoxyethane and 1,2-diethoxyethane. Examples of a solute of the nonaqueous electrolyte are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and a mixture of any of these solutes. Furthermore, the nonaqueous electrolyte may be a gelled polymeric electrolyte obtained by impregnating a polymer such as poly(ethylene oxide) and polyacrylonitrile with a nonaqueous electrolyte or an inorganic solid electrolyte such as LiI and $Li_3N$.

EMBODIMENTS

Other features of the invention will become more apparent in the course of the following descriptions of exemplary embodiments which are given for illustration of the invention and not intended to be limiting thereof.

Experiment 1

A present battery and comparative batteries each of which needs charge before initial discharge were fabricated, so as to examine the charge-discharge cycle performance.

Embodiment 1
Preparation of Positive Electrode

A mixture of 80 parts by weight of a $LiCoO_2$ powder with an average particle size of 20 μm serving as a positive electrode active material, 10 parts by weight of acetylene black serving as a conductive agent and 10 parts by weight of polytetrafluoroethylene serving as a binder was compressedly molded by using a mold with a diameter of 17 mm, thereby preparing a positive electrode in the shape of a pellet.

Preparation of Negative Electrode

Al and Mo with purity of 99.9 wt % were mixed in a mortar in an atomic ratio of 12:1, and the obtained mixture was compressedly molded by using a mold with a diameter of 17 mm to be shaped into a pellet. The pellet was melted into an alloy by arc-melting (with an arc current value set to 300 A in the arc-melting), and the resultant alloy was crushed into an alloy powder with an average particle size of 20 μm to be used as a negative electrode active material. In order to obtain a polyphase alloy, the arc current value was lowered to 100 A after completing the arc-melting, so as to gradually cool the melted alloy for 5 minutes. Thereafter, the arc current was stopped, and the melted alloy was water-cooled in a crucible. It was confirmed through the X-ray powder diffraction method that the thus prepared alloy was a three-phase alloy including an Al phase, an $Al_{12}Mo$ phase and an $Al_5Mo$ phase. The electrochemical potential is the highest in the Al phase and is lower in the order of the $Al_{12}Mo$ phase and the $Al_5Mo$ phase. Also, all of these phases are capable of electrochemically absorbing and discharging lithium ions.

A mixture of 80 parts by weight of the alloy powder and 20 parts by weight of polytetrafluoroethylene serving as a binder was compressedly molded by using a mold with a diameter of 17 mm, thereby preparing a negative electrode in the shape of a pellet.

Preparation of Nonaqueous Electrolyte

A nonaqueous electrolyte was prepared by dissolving 1 mol/liter of $LiPF_6$ in a mixed solvent including ethylene carbonate and diethyl carbonate in a volume ratio of 1:1.

Fabrication of Lithium Secondary Battery

A flat lithium secondary battery (present battery) A1 was fabricated by using the above-described positive electrode, negative electrode and nonaqueous electrolyte. Assuming that the capacity of the negative electrode was 1000 mAh/g, the capacity ratio between the positive electrode and the negative electrode was set to 2:1. A microporous polypropylene film with lithium ion permeability was used as a separator.

FIGURE is a sectional view of the fabricated lithium secondary battery. The lithium secondary battery A1 of FIGURE comprises a positive electrode 1, a negative electrode 2, a separator 3 for separating the electrodes, a positive electrode can 4, a negative electrode can 5, a positive electrode collector 6, a negative electrode collector 7, an insulating packing 8 of polypropylene and the like. The positive electrode 1 and the negative electrode 2 opposing each other with the separator 3 impregnated with the nonaqueous electrolyte sandwiched therebetween are housed in a battery can formed by the positive electrode can 4 and the negative electrode can 5. The positive electrode 1 is connected to the positive electrode can 4 through the positive electrode collector 6 and the negative electrode 2 is connected to the negative electrode can 5 through the negative electrode collector 7, so that chemical energy generated within the battery can can be taken out as electric energy.

COMPARATIVE EXAMPLE 1

A comparative battery B1 was fabricated in the same manner as in Embodiment 1 except that the negative electrode in the shape of a pellet was made from aluminum (pure metal).

COMPARATIVE EXAMPLE 2

A comparative battery B2 was fabricated in the same manner as in Embodiment 1 except that, in fabricating the negative electrode, a heat treatment was carried out at a temperature of 690° C. (lower by 10° C. than the melting point) after obtaining the melted alloy by the arc-melting, so as to give a single phase alloy. It was confirmed through the X-ray powder diffraction method that the alloy obtained after the heat treatment was a single phase alloy including an $Al_{12}Mo$ phase alone.

COMPARATIVE EXAMPLE 3

A comparative battery B3 was fabricated in the same manner as in Embodiment 1 except that, in fabricating the negative electrode, Al and Mo were mixed in an atomic ratio of 5:1 and a heat treatment was carried out at a temperature of 725° C. (lower by 10° C. than the melting point) after obtaining the melted alloy by the arc-melting, so as to give a single phase alloy. It was confirmed through the X-ray powder diffraction method that the alloy obtained after the heat treatment was a single phase alloy including an $Al_5Mo$ phase alone.

Charge-discharge Cycle Performance

The comparative battery B1 was charged with 100 µA at 25° C. and discharged with 100 µA at 25° C. Thus, the discharge capacity of the negative electrode was found to be 800 mAh/g. Subsequently, each of all the batteries including the comparative battery B1 was subjected to a charge-discharge cycle test in each cycle of which the battery was charged with 100 µA at 25° C. to attain a charged electric quantity of the negative electrode of 400 mAh/g (that is, the charged electric quantity for attaining a depth of charge of the negative it electrode of 50% in the comparative battery B1) and discharged with 100 µA at 25° C., thereby obtaining a capacity retention ratio (%) at the 50th cycle defined by a formula below. The results are shown in Table 1. It is noted that the comparative battery B3 was not subjected to the charge-discharge cycle test because the discharge capacity of the negative electrode was lower than 400 Ah/g at the 1st cycle.

Capacity retention ratio (%)=(Discharge capacity at 50th cycle/Discharge capacity at 1st cycle)×100

TABLE 1

| Battery | Negative electrode active material | Positive electrode active material | Capacity retention ratio (%) |
|---|---|---|---|
| A1 | Three-phase alloy of Al phase, $Al_{12}Mo$ phase and $Al_5Mo$ phase | $LiCoO_2$ | 70 |
| B1 | Single phase alloy of Al phase | $LiCoO_2$ | 13 |
| B2 | Single phase alloy of $Al_{12}Mo$ phase | $LiCoO_2$ | 35 |
| B3 | Single phase alloy of $Al_5Mo$ phase | $LiCoO_2$ | — |

It is understood from Table 1 that the present battery A1 exhibits better charge-discharge cycle performance than the comparative batteries B1 and B2.

Experiment 2

A present battery and comparative batteries each of which does not need charge before initial discharge were fabricated, so as to examine the charge-discharge cycle performance.

Embodiment 2

A present battery A2 was fabricated in the same manner as in Embodiment 1 except for the following: In fabricating the positive electrode, 80 parts by weight of a $MnO_2$ powder with an average particle size of 20 µm was used as the active material instead of 80 parts by weight of the $LiCoO_2$ powder with an average particle size of 20 µm, and in fabricating the negative electrode, lithium was introduced into the three-phase alloy by causing short-circuit between the negative electrode in the shape of a pellet and a Li electrode.

COMPARATIVE EXAMPLE 4

A comparative battery B4 was fabricated in the same manner as in Comparative Example 1 except for the following: In fabricating the positive electrode, 80 parts by weight of a $MnO_2$ powder with an average particle size of 20 µm was used as the active material instead of 80 parts by weight of the $LiCoO_2$ powder with an average particle size of 20 µm, and in fabricating the negative electrode, lithium was introduced into the Al phase by causing short-circuit between the negative electrode in the shape of a pellet and a Li electrode.

COMPARATIVE EXAMPLE 5

A comparative battery B5 was fabricated in the same manner as in Comparative Example 2 except for the following: In fabricating the positive electrode, 80 parts by weight of a $MnO_2$ powder with an average particle size of 20 µm was used as the active material instead of 80 parts by weight of the $LiCoO_2$ powder with an average particle size of 20 µm, and in fabricating the negative electrode, lithium was introduced into the $Al_{12}Mo$ phase by causing short-circuit between the negative electrode in the shape of a pellet and a Li electrode.

COMPARATIVE EXAMPLE 6

A comparative battery B6 was fabricated in the same manner as in Comparative Example 3 except for the following: In fabricating the positive electrode, 80 parts by weight of a $MnO_2$ powder with an average particle size of 20 µm was used as the active material instead of 80 parts by weight of the $LiCoO_2$ powder with an average particle size of 20 µm, and in fabricating the negative electrode, lithium was introduced into the $Al_5Mo$ phase by causing short-circuit between the negative electrode in the shape of a pellet and a Li electrode.

Charge-discharge Cycle Performance

Each of the batteries was discharged with 100 µA at 25° C. Thereafter, each battery was subjected to a charge-discharge cycle test in each cycle of which the battery was charged at 25° C. to attain a charged electric quantity of the negative electrode of 400 mAh/g and discharged with 100 µA at 25° C., thereby obtaining the capacity retention ratio (%) at the 50th cycle. The results are shown in Table 2. It is noted that the comparative battery B6 was not subjected to the charge-discharge cycle test because the discharge capacity of the negative electrode was lower than 400 mAh/g at the 1st cycle.

TABLE 2

| Battery | Negative electrode active material | Positive electrode active material | Capacity retention ratio (%) |
|---|---|---|---|
| A2 | Three-phase alloy of Al phase, $Al_{12}Mo$ phase and $Al_5Mo$ phase including lithium | $MnO_2$ | 73 |
| B4 | Single phase alloy of Al phase including lithium | $MnO_2$ | 11 |
| B5 | Single phase alloy of $Al_{12}Mo$ phase including lithium | $MnO_2$ | 38 |
| B6 | Single phase alloy of $Al_5Mo$ phase including lithium | $MnO_2$ | — |

It is understood from Table 2 that the present battery A2 exhibits better charge-discharge cycle performance than the comparative batteries B4 and B5.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising:
   a positive electrode;
   a negative electrode; and
   a nonaqueous electrolyte;
   wherein said negative electrode comprises as an active material an alloy, said alloy including an A phase of a first intermetallic compound (A), and a B phase of a second intermetallic compound (B) having the same constituent elements as and a different composition from the first intermetallic compound (A), and/or a C phase consisting of one of the constituent elements of the first intermetallic compound (A),
   wherein at least one of said A phase, B phase and C phase is capable of electrochemically absorbing and discharging lithium ions; and
   wherein the first intermetallic compound (A) is an intermetallic compound of Al and Mo.

2. The lithium secondary battery according to claim 1, wherein the first intermetallic compound (A) is $Al_{12}Mo$ and the second intermetallic compound (B) is $Al_5Mo$.

3. A negative electrode for a lithium secondary battery comprising a negative electrode,
   wherein said negative electrode comprises as an active material an alloy, said alloy having an A phase of a first intermetallic compound (A), and a B phase of a second intermetallic compound (B) having the same constituent elements as and a different composition from the first intermetallic compound (A), and/or a C phase consisting of one of the constituent elements of the first intermetallic compound (A),
   wherein at least one of said A phase, B phase and C phase is capable of electrochemically absorbing and discharging lithium ions; and
   wherein the first intermetallic (A) is an intermetallic compound of Al and Mo.

4. The lithium secondary battery according to claim 3, wherein the first intermetallic compound (A) is $Al_{12}Mo$ and the second intermetallic compound (B) is $Al_5Mo$.

* * * * *